(12) United States Patent
Hatsumi et al.

(10) Patent No.: US 8,947,025 B2
(45) Date of Patent: Feb. 3, 2015

(54) REGENERATION CONTROL DEVICE OF ELECTRICALLY POWERED VEHICLE

(75) Inventors: Norihiko Hatsumi, Anjo (JP); Yoshiaki Sano, Okazaki (JP); Toshiyuki Matsumi, Nagoya (JP); Takanori Sugimoto, Tsushima (JP); Hiroaki Miyamoto, Okazaki (JP); Yasuyuki Hatsuda, Okazaki (JP); Akira Hashizaka, Okazaki (JP); Masanori Watanabe, Okazaki (JP); Nobuaki Ohta, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 18 days.

(21) Appl. No.: 13/548,815

(22) Filed: Jul. 13, 2012

(65) Prior Publication Data

US 2013/0015791 A1    Jan. 17, 2013

(30) Foreign Application Priority Data

Jul. 15, 2011 (JP) ................................. 2011-156268
Jul. 15, 2011 (JP) ................................. 2011-156269
Jul. 15, 2011 (JP) ................................. 2011-156270

(51) Int. Cl.
*H02P 1/00* (2006.01)
*B60L 11/18* (2006.01)
(Continued)

(52) U.S. Cl.
CPC ............. *B60L 11/1803* (2013.01); *B60L 7/14* (2013.01); *B60L 11/1861* (2013.01); *B60L 11/1872* (2013.01); *B60L 15/20* (2013.01); *B60L 2240/429* (2013.01); *B60L 2240/545* (2013.01); *Y02T 10/7044* (2013.01);
(Continued)

(58) Field of Classification Search
USPC ............ 318/276, 139, 434; 180/65.29, 65.31, 180/65.51; 320/132, 134, 136, 140, 153, 320/159, 162, 164
See application file for complete search history.

(56) References Cited

U.S. PATENT DOCUMENTS 6,154,011 A    11/2000  Lam et al.
6,223,106 B1    4/2001  Yano et al.
6,232,729 B1 *  5/2001  Inoue ........................... 318/139
(Continued)

FOREIGN PATENT DOCUMENTS

JP    11-332017 A    11/1999
JP    2001-128315 A    5/2001
(Continued)

*Primary Examiner* — Eduardo Colon Santana
*Assistant Examiner* — Bickey Dhakal
(74) *Attorney, Agent, or Firm* — Birch, Stewart, Kolasch & Birch, LLP.

(57) ABSTRACT

A regeneration control device of an electrically powered vehicle includes a motor generator which performs electric power regeneration by braking a driving wheel of the electrically powered vehicle, and a battery to which electric power regenerated by the motor generator is supplied. A monitoring unit includes at least one of a charging rate detection unit configured to detect a charging rate of the battery and a voltage value detection unit configured to detect a voltage value of the battery. A control unit controls the electric power regeneration of the motor generator according to at least one of the charging rate and the voltage value of the battery detected by the monitoring unit. The control unit is configured to decrease regenerative electric current of the motor generator as at least one of the charging rate and the voltage value is increased.

12 Claims, 14 Drawing Sheets

(51) Int. Cl.
*B60L 7/14* (2006.01)
*B60L 15/20* (2006.01)

(52) U.S. Cl.
CPC .......... *Y02T 10/7005* (2013.01); *Y02T 10/705* (2013.01); *Y02T 10/642* (2013.01)
USPC ........................... 318/139; 318/434; 320/132

(56) References Cited

U.S. PATENT DOCUMENTS

| | | | |
|---|---|---|---|
| 6,870,336 B2 * | 3/2005 | Murakami et al. | 318/432 |
| 7,994,745 B2 * | 8/2011 | Fujino et al. | 318/376 |
| 2008/0211438 A1 * | 9/2008 | Bell et al. | 318/376 |
| 2009/0039815 A1 | 2/2009 | Fujino et al. | |
| 2009/0309551 A1 | 12/2009 | Lazarovich et al. | |
| 2011/0001352 A1 * | 1/2011 | Tamura et al. | 307/9.1 |
| 2011/0109274 A1 | 5/2011 | Minamiura | |
| 2011/0270477 A1 | 11/2011 | Ueki | |
| 2011/0285357 A1 | 11/2011 | Kikuchi et al. | |
| 2014/0097676 A1 * | 4/2014 | Kusumi | 307/10.1 |

FOREIGN PATENT DOCUMENTS

| | | |
|---|---|---|
| JP | 2002-58106 A | 2/2002 |
| JP | 2003-125502 A | 4/2003 |
| JP | 2005-33981 A | 2/2005 |
| JP | 2009-124838 A | 6/2009 |
| JP | 2010-57325 A | 3/2010 |
| JP | 2011-125210 A | 6/2011 |
| JP | 2011-131829 A | 7/2011 |
| WO | WO 2010/079595 A1 | 7/2010 |
| WO | WO 2010/137334 A1 | 12/2010 |

* cited by examiner

REGENERATION CONTROL DEVICE OF ELECTRICALLY POWERED VEHICLE

BACKGROUND

The present invention is related to a regeneration control device of an electrically powered vehicle.

An electrically powered vehicle such as an electric vehicle (EV) or a hybrid electric vehicle (HEV or PHEV) includes a battery device including a plurality of storage cells (secondary cells; hereinafter, referred to as cells) and a motor which rotates by electric power supply from the battery device, and drives driving wheels using the motor as a power source. In such an electrically powered vehicle, at the time of braking, braking of the driving wheels is performed by regenerative torque of the motor, the motor generates electric power using torque of the driving wheels, and the generated electric power is charged into the cells, to thereby perform electric power regeneration.

[Patent Document 1] JP-A-2005-033981

SUMMARY

In the above-described electrically powered vehicle, at the time of regeneration, in order to prevent overcharge of the cells, regenerative electric current is controlled so that cell voltage does not exceed an upper limit voltage. For example, as shown in FIG. 7, at the time of braking, the regenerative electric current which flows in the cells is generated by the motor, in which the regeneration is performed using the maximum flowable regenerative electric current until the cell voltage reaches the upper limit voltage Vu. Further, if the braking is continued intermittently, the cell voltage is also increased, and then, at a time t when the cell voltage reaches the upper limit voltage Vu, the regenerative electric current is decreased. In FIG. 9, one pulse represents one-time braking, and the pulse widths are shown as the same width for simplicity of the drawing.

As the cells used in the battery device, there are cells having a relatively superior input characteristic (charging characteristic). In the cells having such a characteristic, the decreased regenerative electric current is relatively large. In such a cell, since the input characteristic is superior, the acceptability of the regenerative electric current is not changed compared with the initial input time, and thus, the increase in the cell voltage is large in one-time braking even in the vicinity of full charging. Thus, when the electric power regeneration is controlled so that the cell voltage does not exceed the upper limit voltage Vu, the amount of regenerated electric power is considerably decreased at a time at the time t when the cell voltage reaches the upper limit voltage Vu, as shown in FIG. 9, and thus, the decreased regenerative electric current becomes large.

If the regenerative electric current is decreased during regenerative braking, the regenerative torque is also decreased according to the electric current decrease (lack of the regenerative torque), and as a result, a braking force is decreased due to the torque lack. Further, in a case where the regenerative electric current decreased during regenerative braking is large, the regenerative torque, that is, the braking force is also considerably decreased. Thus, when a driver operates a foot brake during regenerative braking, the driver's feeling of braking is unsettling due to the torque lack. That is, even though the driver steps on a brake pedal with a constant force, the driver feels that the braking force is decreased.

An advantage of a first aspect of the invention is to provide a regeneration control device of an electrically powered vehicle which suppresses a large change in regenerative electric current and regenerative torque during regenerative braking when cell voltage is increased up to the vicinity of an upper limit.

Further, another advantage of a second aspect of the invention is to provide a regeneration control device of an electrically powered vehicle which is capable of preventing deterioration of a battery and suppressing uncomfortable driving feeling of a driver by switching control of electric power regeneration on the basis of a battery temperature.

According to the first aspect of the invention, there is provided a regeneration control device of an electrically powered vehicle, comprising:

a motor generator configured to perform electric power regeneration by braking a driving wheel of the electrically powered vehicle;

a battery to which electric power regenerated by the motor generator is supplied;

monitoring means including at least one of charging rate detection means configured to detect a charging rate of the battery and voltage value detection means configured to detect a voltage value of the battery; and control means configured to control the electric power regeneration of the motor generator according to at least one of the charging rate and the voltage value of the battery detected by the monitoring means, wherein the control means is configured to decrease regenerative electric current of the motor generator as at least one of the charging rate and the voltage value is increased.

The control means may be configured to decrease the regenerative electric current of the motor generator as the charging rate detected by the charging rate detection means is increased.

The control means may be configured to restrict, in a state where the charging rate of the battery is smaller than a predetermined value, the decrease in the regenerative electric current of the motor generator as the charging rate is increased.

The control means may be configured to perform a series of regenerative controls by performing the electric power regeneration a plurality of times and to make constant the regenerative electric current in each electric power regeneration among the plurality of electric power regenerations.

The control means may be configured to decrease the regenerative electric current of the motor generator as the voltage value detected by the voltage value detection means is increased.

The control means may be configured to perform a series of regenerative controls by performing the electric power regeneration a plurality of times and to make constant a decreasing rate of the regenerative electric current in each electric power regeneration among the plurality of electric power regenerations.

The control means may be configured to make an amount of generated electric power at start of one of the electric power regenerations equal to an amount of generated electric power at end of another one of the electric power regenerations followed by the one of electric power regeneration.

The regeneration control device may be configured such that: the monitoring means further includes temperature detection means configured to detect a temperature of the battery, and the control means increases the regenerative electric current as the temperature of the battery detected by the temperature detection means is increased.

According to the second aspect of the invention, there is provided a regeneration control device of an electrically powered vehicle, comprising:

a motor generator configured to perform electric power regeneration by braking a driving wheel of the electrically powered vehicle;

a battery to which electric power regenerated by the motor generator is supplied;

temperature detection means configured to detect a temperature of the battery;

voltage detection means configured to detect a voltage value of the battery;

charging rate detection means configured to detect a charging rate of the battery; and control means configured to control the electric power regeneration of the motor generator, wherein the control means sets, in a state where the temperature of the battery detected by the temperature detection means is lower than a predetermined value, regenerative electric current supplied to the battery based on the voltage value of the battery detected by the voltage detection means, and wherein the control means sets, in a state where the temperature of the battery detected by the temperature detection means is equal to or higher than the predetermined value, the regenerative electric current supplied to the battery based on the charging rate detected by the charging rate detection means.

The control means may be configured to increase the regenerative electric current as the temperature of the battery is increased.

The regeneration control device may be configured such that an increasing rate of the regenerative electric current with respect to the temperature of the battery which is calculated based on the charging rate is larger than the increasing rate of the regenerative electric current with respect to the temperature of the battery which is calculated based on the voltage value.

DETAILED DESCRIPTION OF EXEMPLIFIED EMBODIMENTS

Hereinafter, embodiments of a regeneration control device of an electrically powered vehicle according to the invention will be described with reference to FIGS. 1 to 6. The regeneration control device of the electrically powered vehicle according to the invention is described using an electric vehicle as an example, but the invention is not limited to the electric vehicle, and may be applied to an electrically powered vehicle such as a hybrid electric vehicle.

Figure 1:
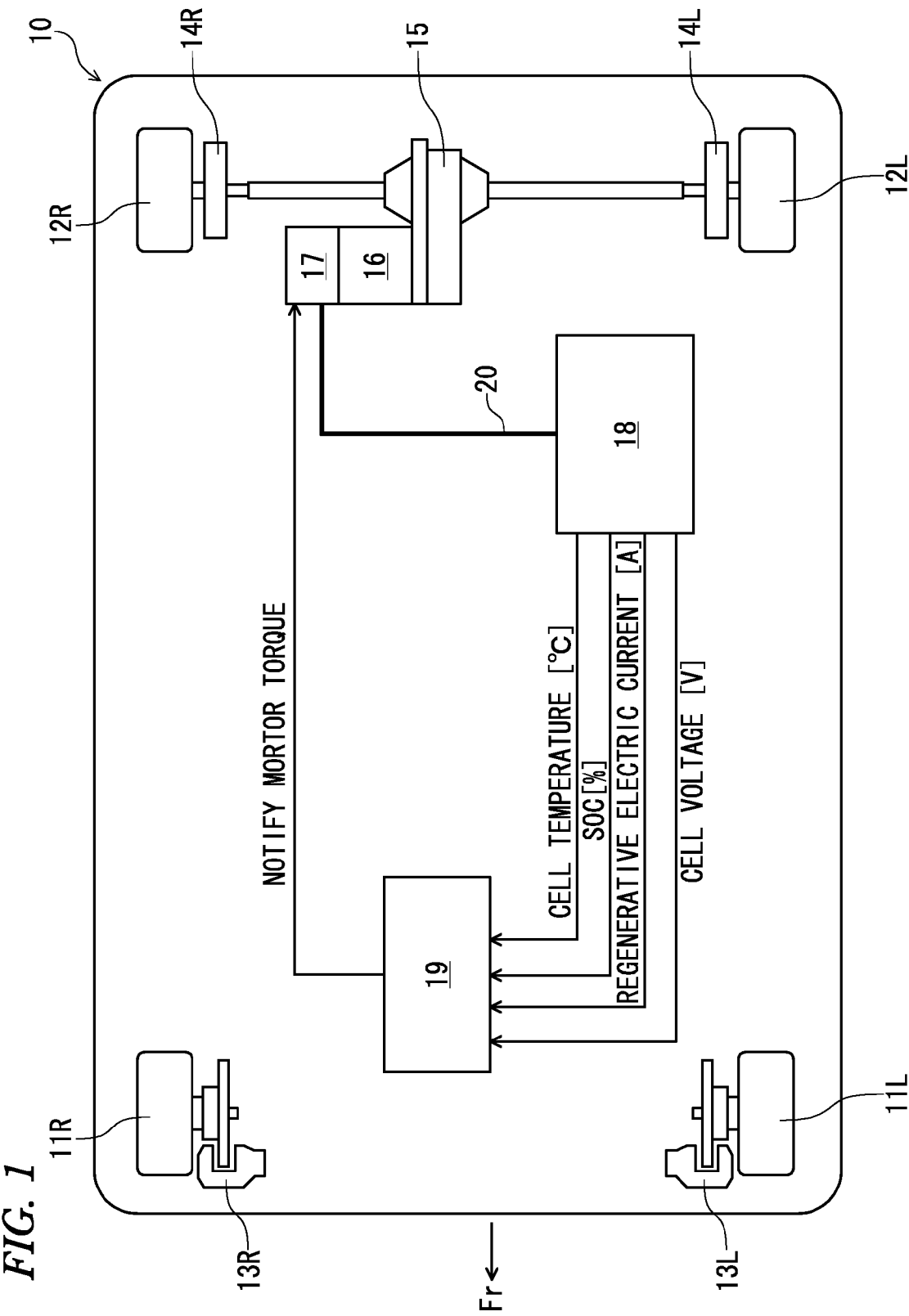
FIG. 1 is a configuration diagram schematically illustrating a regeneration control device of an electrically powered vehicle according to the invention.
Figure 2:
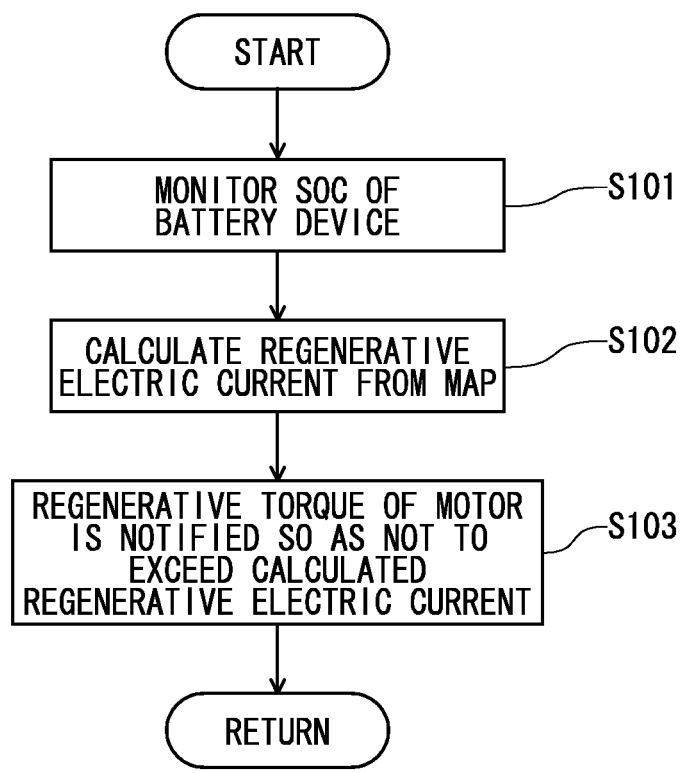
FIG. 2 is a flowchart illustrating a first embodiment of a control in the regeneration control device of the electrically powered vehicle shown in FIG. 1.
Figure 3:
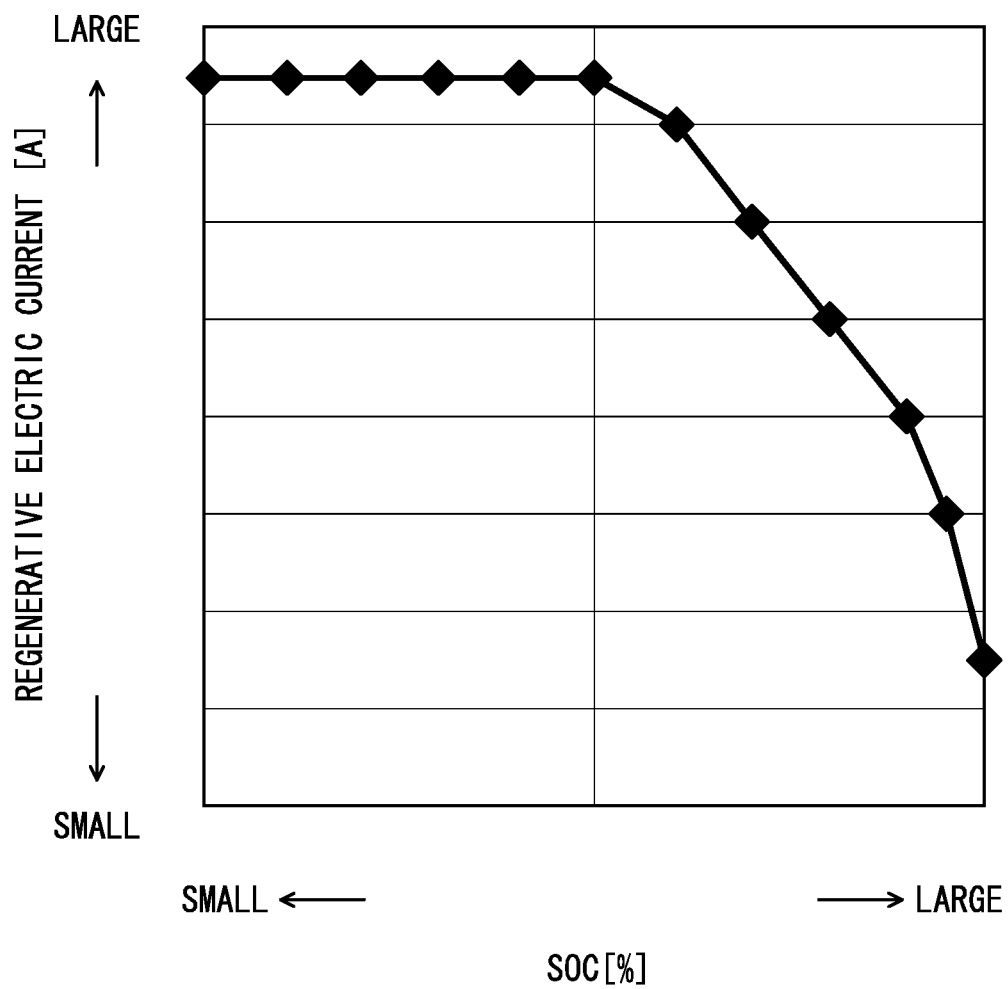
FIG. 3 is a map used for the control shown in FIG. 2.
Figure 4:
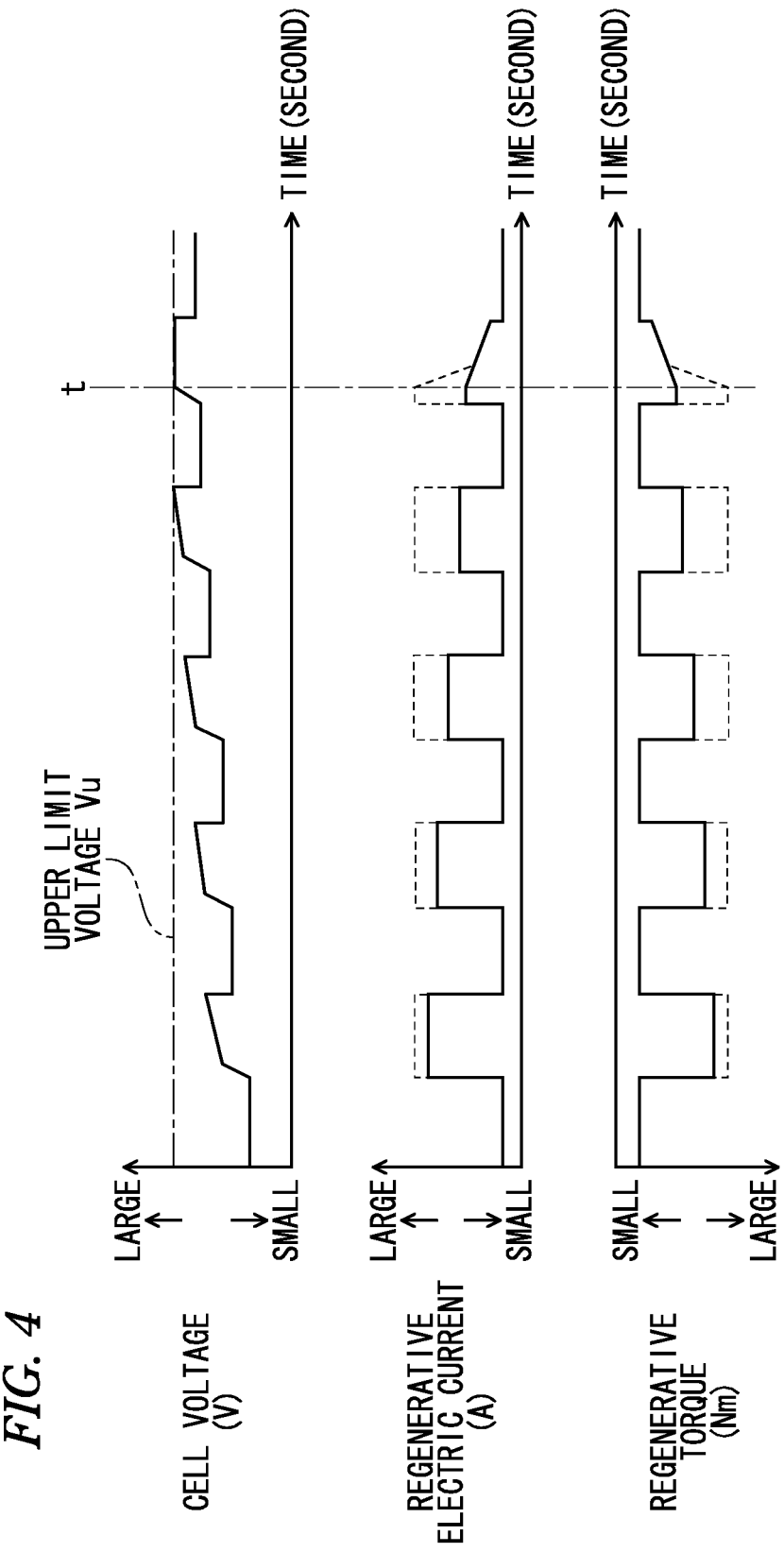
FIG. 4 is a time chart illustrating an example of change in cell voltage, regenerative electric current and regenerative torque according to the control shown in FIG. 2.

FIG. 1 is a configuration diagram schematically illustrating a regeneration control device of an electrically powered vehicle according to the invention, FIG. 2 is a flowchart illustrating a control in the regeneration control device of the electrically powered vehicle shown in FIG. 1, FIG. 3 is a map used for the control shown in FIG. 2, and FIG. 4 is a time chart illustrating change in cell voltage, regenerative electric current and regenerative torque according to the control shown in FIG. 2.

A vehicle 10 is an electric vehicle. The vehicle 10 includes left and right front wheels 11L and 11R, left and right rear wheels 12L and 12R, and braking devices 13L and 13R are respectively installed in the front wheels 11L and 11R, and also, braking devices 14L and 14R are respectively installed in the rear wheels 12L and 12R.

The vehicle 10 is a rear-wheel drive type, and the rear wheels 12L and 12R are mechanically connected to a motor (motor generator) 16 through a gear box 15 to rotate the motor 16, and thus, the rear wheels 12L and 12R are driven. The motor 16 also functions as a power generator. "Fr" in FIG. 1 represents the front side of the vehicle. Here, a rear-wheel drive configuration is shown as an example, but a front-wheel drive configuration or a four-wheel drive configuration may be employed.

The motor 16 is electrically connected to a battery device (battery) 18 through an inverter 17 which performs DC-AC conversion and a power source cable 20, and electric power from the battery device 18 is supplied to the motor 16 through the inverter 17 and the power source cable 20. An ECU (Electronics Control Unit; control means) 19 which indicates motor torque is connected to the inverter 17. Further, the battery device 18 includes a plurality of cells, and outputs the temperature, regenerative electric current, cell voltage, SOC (state of charge), or the like of the cells to the ECU 19. The SOC may be assumed as a charging rate.

The ECU 19 includes a CPU (microcomputer) which conducts operations, a ROM (read only memory) which is a storage area of a control program, a RAM (random access memory) which is a working area of the control program, an I/O interface which performs input and output of various signals, and the like as hardware, and includes the control program which performs a predetermined control as software.

Further, for example, in a case where the vehicle 10 is in operation, the ECU 19 notifies appropriate running torque to the inverter 17 according to the vehicle speed, the opening level of an accelerator pedal (not shown), or the like, and rotates the motor 16 using the electric power supplied from the battery device 18 to drive the rear wheels 12L and 12R so that the notified running torque is output.

On the other hand, when the vehicle 10 is braked, the ECU 19 controls the braking devices 13L, 13R, 14L and 14R according to the stepping level of a brake pedal (not shown) or the like to brake the front wheels 11L and 11R and the rear wheels 12L and 12R, and also brakes the rear wheels 12L and 12R using regenerative torque of the motor 16. Here, the ECU 19 generates electric power by the motor 16 using the torque of the rear wheels 12L and 12R which are driving wheels, and then supplies the generated electric power (regenerated electric power) to the battery device 18 through the inverter 17 and the power source cable 20, to thereby perform electric power regeneration. The regenerative torque has two types of torque based on the stepping level of the brake pedal (brake pedal regeneration) and torque corresponding to an engine brake in an engine vehicle (engine brake regeneration).

A regeneration control device according to a first embodiment of the invention will be described.

When the cell voltage of the battery device 18 reaches an upper limit voltage, the regenerative torque of the motor 16 is restricted, and regenerative electric current flowing in the battery device 18 is restricted. In order to suppress considerable fluctuation in the regenerative torque during regenerative braking when the regenerative electric current is restricted, the ECU 19 monitors the SOC of the battery device 18, calculates the regenerative electric current according to the SOC, and controls the regenerative torque of the motor 16 so as not to exceed the regenerative electric current. Such a control will be described with reference to the flowchart of FIG. 2, the map of FIG. 3 and the time chart of FIG. 4 together with FIG. 1. In FIG. 4, one pulse represents one-time braking, and all the pulse widths are shown as the same width for simplicity of the drawings. Further, for comparison, time charts of regenerative electric current and regenerative torque in the related art are shown by dashed lines.

Firstly, the SOC output from the battery device 18 is monitored (step S101). The SOC of the battery device 18 is correlated to the cell voltage. For example, by installing a monitoring unit (charging rate detection means) which measures the cell voltage of the battery device 18 and calculates the SOC from the measured cell voltage in the battery device 18 and by outputting the SOC to the ECU 19 from the monitoring unit, the SOC of the battery device 18 is monitored. Further, by calculating the SOC from the cell voltage output to the ECU 19 from the battery device 18, the SOC of the battery device 18 may be monitored by the ECU 19 (charging rate detection means).

The regenerative electric current to the output SOC is calculated from the map of the regenerative electric current to the SOC, shown in FIG. 3 (step S102). The calculated regenerative electric current means a maximum electric current value (upper limit value) capable of flowing under corresponding conditions. In the map shown in FIG. 3, the regenerative electric current to the SOC has an approximately constant value in a case where the SOC is lower than a predetermined value, but in a case where the SOC is the predetermined value or higher, the regenerative electric current is decreased as the SOC is increased. This is because, since even though charging power is sufficiently supplied to the battery device 18 in a case where the SOC is lower than the predetermined value, the cell voltage does not reach the upper limit voltage of the battery device 18, the supply of the regenerated electric power as much as possible can result in efficient charging of the battery device 18. Accordingly, in a case where the SOC is lower than the predetermined value, differently from a case where the SOC is the predetermined value or higher, the regenerative electric current is prevented from being decreased as the SOC is increased. For example, in a case where the SOC is smaller than half of full charging, the regenerative electric current has an approximately constant value, and in a case where the SOC is half of full charging or higher, the regenerative electric current is decreased as the SOC is increased.

Further, the regenerative torque of the motor 16 is notified to the inverter 17 in order not to exceed the calculated regenerative electric current (step S103). That is, according to the SOC of the battery device 18, if the SOC is the predetermined value or higher, the regenerative electric current is decreased as the SOC is increased. With such a control, as shown in FIG. 4, whenever the regeneration is performed, the cell voltage is increased, but since the SOC is increased as the cell voltage is increased, the regenerative electric current is decreased in the SOC of the predetermined value or higher. Thus, at a time t when the cell voltage reaches an upper limit voltage Vu, since the regenerative electric current is already in a decreased state, it is not necessary to considerably decrease the regenerative electric current at a time, differently from the technique in the related art. As a result, it is possible to control the regenerative electric current so that the cell voltage does not exceed the upper limit voltage Vu, and since change in the regenerative electric current and change in the regenerative torque when the cell voltage is increased up to the vicinity of the upper limit voltage are decreased, it is possible to reduce the feeling of braking being unsettling.

Here, in FIG. 4, at the start of braking, the regenerative electric current is calculated on the basis of the SOC of the battery device 18 using the map shown in FIG. 3, and during one-time braking (during one-time electric power regeneration), the regenerative electric current is constant as the calculated regenerative electric current. Further, by performing the electric power regeneration a plurality of times, a series of regenerative controls may be performed, and the regenerative electric current of each electric power regeneration in the plurality of electric power regenerations may be constant. This is based on the consideration that it is preferable to make constant the regenerative electric current during one-time electric power regeneration in consideration of the fact that even though the regenerative electric current is supplied to the battery device 18, the regenerative electric current is not immediately reflected in the SOC and the SOC is not immediately changed with respect to change in the cell voltage. In this case, the regenerative electric current is constant during one-time electric current regeneration, but since the regenerative electric current is decreased as the cell voltage is increased through regeneration, at the time t when the cell voltage reaches the upper limit voltage Vu, the regenerative electric current is already in a decreased state, and change in the regenerative electric current and change in the regenerative torque at that time are decreased, to thereby reduce uncomfortable braking feeling.

A modification example of the first embodiment will be described.

Figure 5:
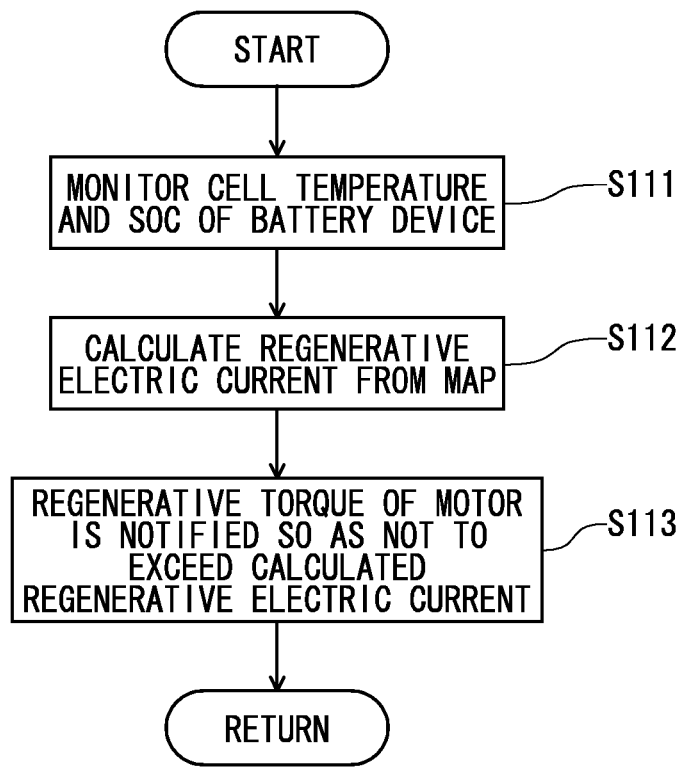
FIG. 5 is a flowchart illustrating a modification example of the control in the regeneration control device of the electrically powered vehicle shown in FIG. 2.
Figure 6:
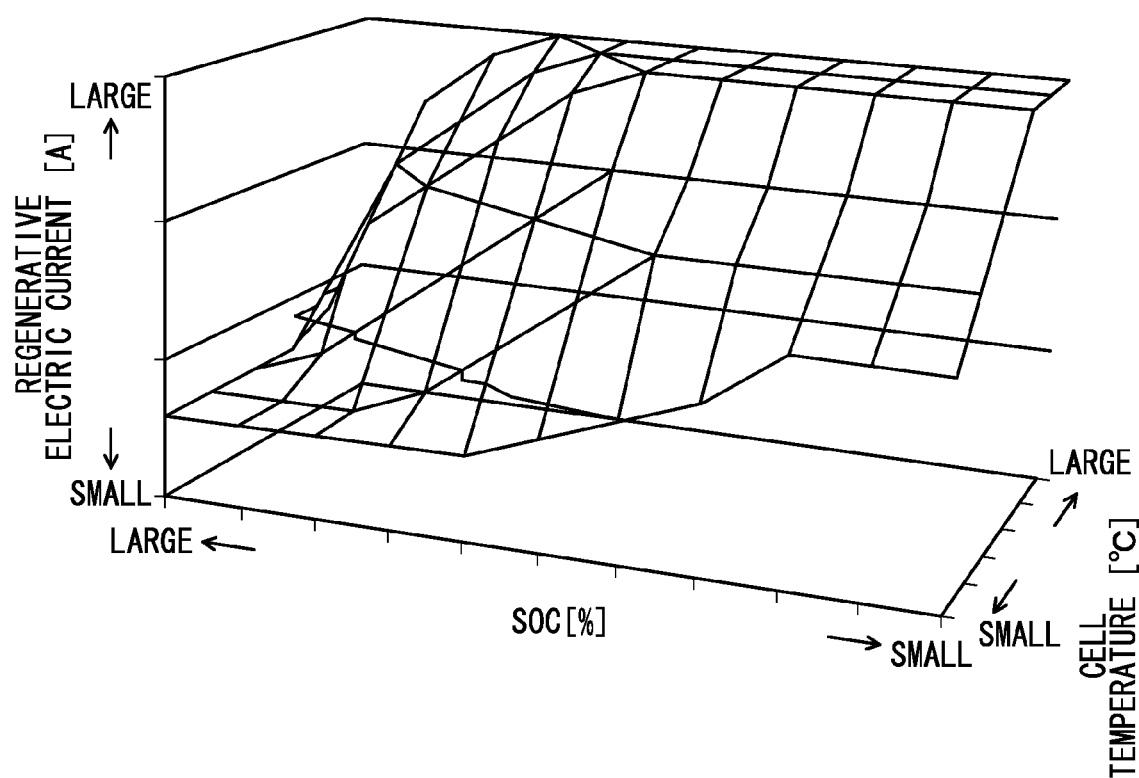
FIG. 6 is a map used for the control shown in FIG. 5.

FIG. 5 is a flowchart illustrating a control in the present modification example, and FIG. 6 is a map used for the control shown in FIG. 5. Since a regeneration control device of an electrically powered vehicle in the present modification example may have the same configuration as the regeneration control device of the electrically powered vehicle shown in FIG. 1 according to the first embodiment, repetitive description thereof will be omitted.

In the regeneration control device of the electrically powered vehicle in the present modification example, when the cell voltage of the battery device 18 reaches the upper limit voltage, the regenerative torque of the motor 16 is restricted, and the regenerative electric current flowing in the battery device 18 is restricted. In order to suppress considerable fluctuation in the regenerative torque during regenerative braking when the regenerative electric current is restricted, the ECU 19 monitors the SOC and cell temperature of the battery device 18, calculates the regenerative electric current according to the SOC and the cell temperature, and controls the regenerative torque of the motor 16 so as not to exceed the regenerative electric current. Such a control will be described with reference to the flowchart of FIG. 5 and the map of FIG. 6 together with FIG. 1.

Firstly, the SOC and the cell temperature output from the battery device 18 are monitored (step S111). With respect to the cell temperature, for example, the temperature of each cell is monitored by the above-mentioned monitoring unit (temperature detection means). Further, the cell temperature of the battery device 18 may be directly monitored by the ECU 19 (temperature detection means). Here, it is preferable that the cell temperature be the temperature of a cell which is at the lowest temperature among all the cells in the battery device 18.

The regenerative electric current to the output SOC and the cell temperature is calculated from the 3D map of the regenerative electric current to the SOC and the cell temperature, shown in FIG. 6 (step S112). The calculated regenerative electric current means a maximum electric current value (upper limit value) capable of flowing under corresponding conditions. In the 3D map shown in FIG. 6, the regenerative electric current to the SOC has an approximately constant value in a case where the SOC is lower than a predetermined value, but in a case where the SOC is the predetermined value or higher, the regenerative electric current is decreased as the SOC is increased. Further, in the regenerative electric current to the cell temperature, the regenerative electric current is decreased as the cell temperature is decreased, whereas the regenerative electric current is increased as the cell temperature is increased. For example, in a case where the SOC is lower than the half of the full charging, the value of the regenerative electric current is approximately constant, and in a case where the SOC is half of the full charging or higher, the regenerative electric current is decreased as the SOC is increased.

Further, the regenerative torque of the motor 16 is notified to the inverter 17 in order not to exceed the calculated regenerative electric current (step S113). That is, the regenerative electric current is changed according to the SOC and the cell temperature of the battery device 18, and if the SOC is the predetermined value or higher, the regenerative electric current is decreased as the SOC is increased, and the regenerative electric current is increased as the cell temperature is increased. Thus, it is possible to generate optimal regenerative electric current according to the cell temperature. Further, by considering the cell temperature in order to calculate the regenerative electric current, it is possible to perform preferable charging and to suppress cell deterioration. With such a control, as shown in FIG. 4, whenever the regeneration is performed, the cell voltage is increased, but since the SOC is increased as the cell voltage is increased, the regenerative electric current is decreased in the SOC of the predetermined value or higher. Thus, at the time t when the cell voltage reaches the upper limit voltage Vu, since the regenerative electric current is already in a decreased state, it is not necessary to considerably decrease the regenerative electric current at a time differently from the technique in the related art. As a result, it is possible to control the regenerative electric current so that the cell voltage does not exceed the upper limit voltage Vu, and since change in the regenerative electric current and change in the regenerative torque when the cell voltage is increased up to the vicinity of the upper limit voltage are decreased, it is possible to reduce the feeling of braking being unsettling.

A regeneration control device according to a second embodiment of the invention will be described.

Figure 7:
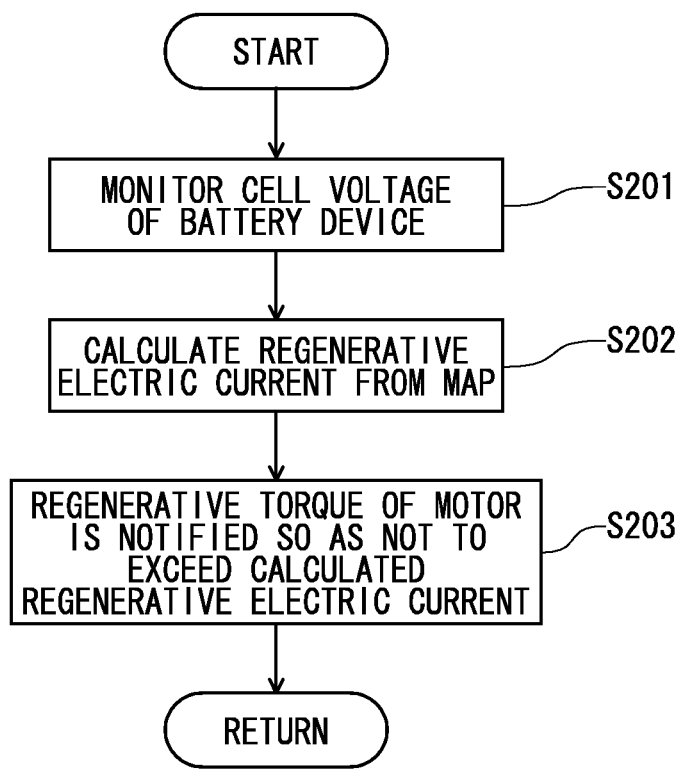
FIG. 7 is a flowchart illustrating a second embodiment of the control in the regeneration control device of the electrically powered vehicle shown in FIG. 1.

When the cell voltage of the battery device 18 reaches the upper limit voltage, the regenerative torque of the motor 16 is restricted, and the regenerative electric current flowing in the battery device 18 is restricted. In order to suppress considerable fluctuation in the regenerative torque during regenerative braking when the regenerative electric current is restricted, the ECU 19 monitors the cell voltage of the battery device 18, calculates the regenerative electric current according to the cell voltage, and controls the regenerative torque of the motor 16 so as not to exceed the regenerative electric current. Such a control will be described with reference to the flowchart of FIG. 7, the map of FIG. 8 and the time charts of FIGS. 9 and 4 together with FIG. 1. In FIGS. 9 and 4, one pulse represents one-time braking, and all the pulse widths are shown as the same width for simplicity of the drawings. Further, for comparison, time charts of regenerative electric current and regenerative torque in the related art are shown by dashed lines.

Firstly, the cell voltage output from the battery device 18 is monitored (step S201). With respect to the cell voltage, for example, by installing a monitoring unit (voltage detection means) which measures the cell voltage of the battery device 18 in the battery device 18 and by outputting the cell voltage to the ECU 19 from the monitoring unit, the cell voltage of the battery device 18 is monitored. Further, the cell voltage of the battery device 18 may be directly monitored by the ECU 19 (voltage detection means).

Figure 8:
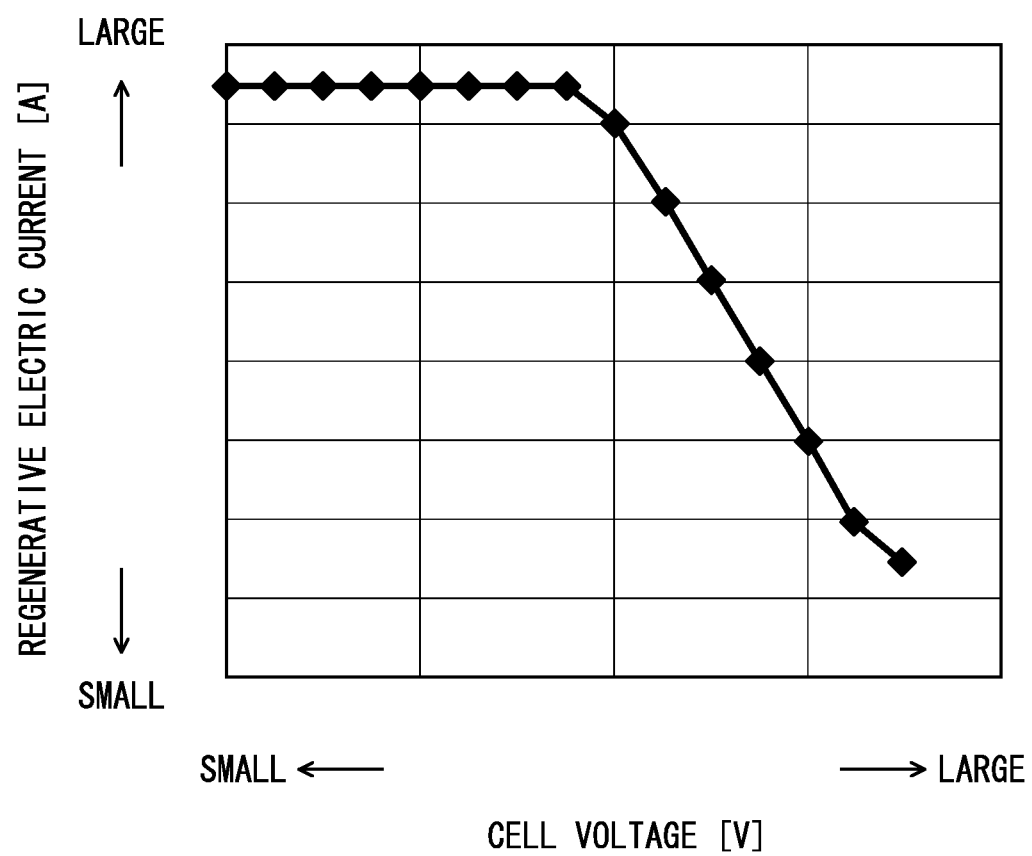
FIG. 8 is a map used for the control shown in FIG. 7.
Figure 9:
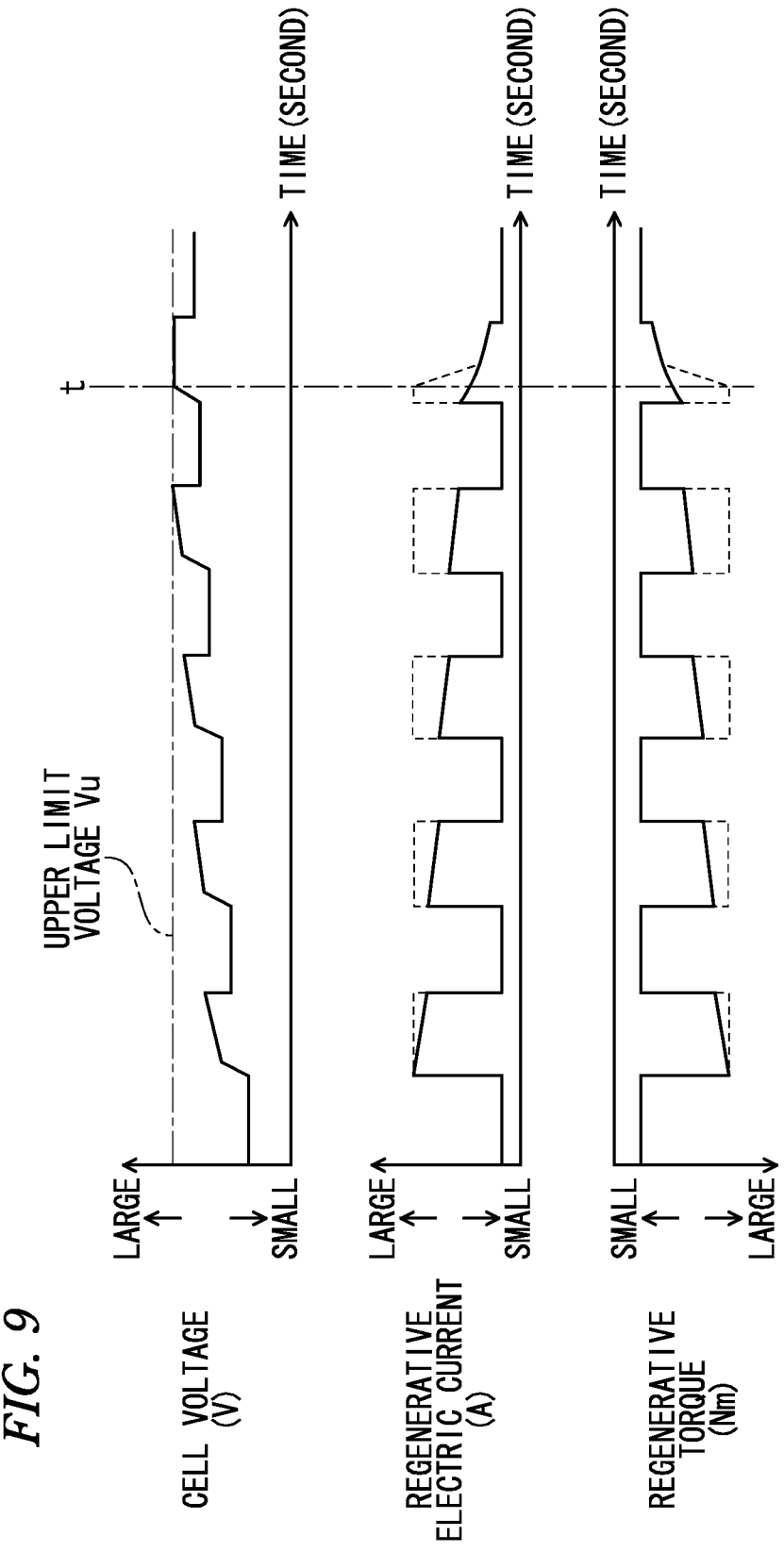
FIG. 9 is a time chart illustrating an example of change in cell voltage, regenerative electric current and regenerative torque according to the control shown in FIG. 7.

The regenerative electric current to the output cell voltage is calculated from the map of the regenerative electric current to the cell voltage, shown in FIG. 8 (step S202). The calculated regenerative electric current means a maximum electric current value (upper limit value) capable of flowing under corresponding conditions. In the map shown in FIG. 8, the regenerative electric current to the cell voltage has an approximately constant value when the cell voltage is lower than a predetermined value, but if the cell voltage is the predetermined value or higher, the regenerative electric current is decreased as the cell voltage is increased. This is because, since even though charging power is sufficiently supplied to the battery device 18 in a case where the cell voltage is lower than the predetermined value, the cell voltage does not reach the upper limit voltage of the battery device 18, the supply of the regenerated electric power as much as possible can result in efficient charging of the battery device 18. Accordingly, in a case where the cell voltage is lower than the predetermined value, the regenerative electric current may be prevented from being decreased as the cell voltage is increased. For example, in a case where the cell voltage is smaller than a half of the upper limit voltage, the regenerative electric current has an approximately constant value, and in a case where the cell voltage is the half of the upper limit voltage or higher, the regenerative electric current is decreased as the cell voltage is increased.

Further, the regenerative torque of the motor 16 is notified to the inverter 17 in order not to exceed the calculated regenerative electric current (step S203). That is, according to the cell voltage of the battery device 18, if the cell voltage is the predetermined value or higher, the regenerative electric current is decreased as the cell voltage is increased. With such a control, as shown in FIGS. 9 and 4, whenever the regeneration is performed, the cell voltage is increased, but if the cell voltage is the predetermined value or higher, the regenerative electric current is decreased as the cell voltage is increased. Thus, at the time t when the cell voltage reaches the upper limit voltage Vu, since the regenerative electric current is already in a decreased state, it is not necessary to considerably decrease the regenerative electric current at a time, differently from the technique in the related art. As a result, it is possible to control the regenerative electric current so that the cell voltage does not exceed the upper limit voltage Vu, and since change in the regenerative electric current and change in the regenerative torque when the cell voltage is increased up to the vicinity of the upper limit voltage are decreased, it is possible to reduce the feeling of braking being unsettling.

Here, in FIG. 9, during one-time braking (during one-time electric power regeneration), since the regenerative electric current is decreased as the cell voltage is increased, in one pulse indicating one-time braking (one-time electric power regeneration), the regenerative electric current is decreased. In this case, when the vehicle travels on a long downhill, even though the cell voltage reaches the upper limit voltage Vu, since change in the regenerative electric current and change in the regenerative torque at that time are decreased, it is possible to reduce the feeling of braking being unsettling. In FIG. 9, the regenerative electric current is calculated on the basis of the changed cell voltage using the map shown in FIG. 8, and the regenerative electric current may be changed according to change in the cell voltage.

Further, by performing the electric power regeneration a plurality of times, a series of regenerative controls may be performed, and the decreasing rate of the regenerative electric current of each electric power regeneration in the plurality of electric power regenerations may be constant. Further, the regenerative electric current may be set so that the regenerative electric current at the end of the previous electric power regeneration and the regenerative electric current at the start of the next electric power regeneration are the same. With such a control, since the regenerative electric current is decreased at the constant decreasing rate, it is possible to reduce the feeling of braking being unsettling during one-time braking. Further, in the regenerative brakings which are continuously performed, by making the same the regenerative electric current at the end of the previous braking and the regenerative electric current at the start of the next braking, it is possible to reduce the driver feeling unsettled.

On the other hand, in FIG. 4, at the start of braking, the regenerative electric current is calculated on the basis of the cell voltage of the battery device 18 using the map shown in FIG. 8, and during one-time braking (during one-time electric power regeneration), the regenerative electric current is constant as the calculated regenerative electric current. Further, by performing the electric power regeneration a plurality of times, a series of regenerative controls may be performed, and the regenerative electric current of each electric power regeneration in the plurality of electric power regenerations may be constant. In this case, the regenerative electric current in one-time electric power regeneration is constant, but if the cell voltage is the predetermined value or higher, the regenerative electric current is decreased as the cell voltage is increased through the regeneration. Thus, at the time t when the cell voltage reaches the upper limit voltage Vu, since the regenerative electric current is already in a decreased state and change in the regenerative electric current and change in the regenerative torque at that time are decreased, it is possible to reduce uncomfortable brake feeling.

Figure 10:
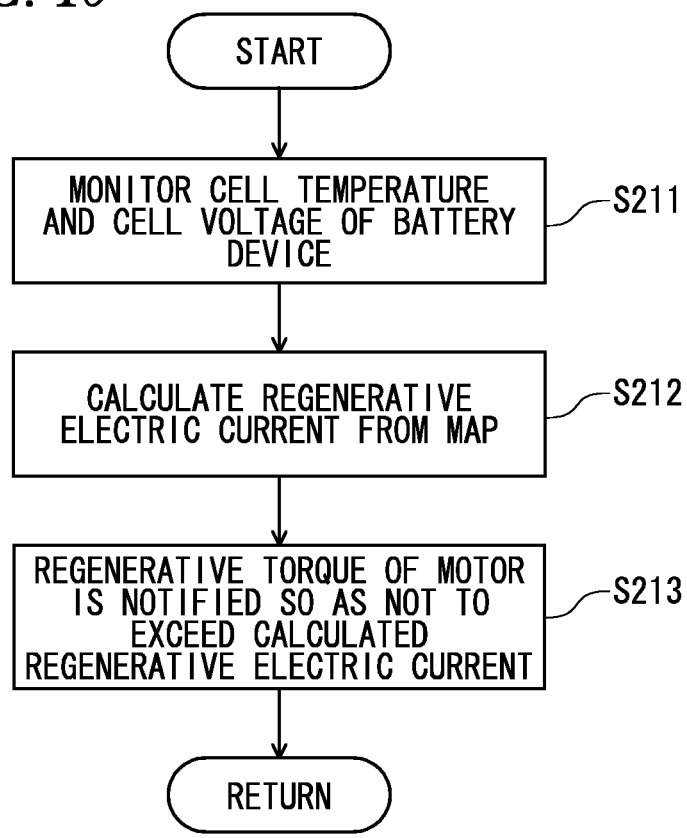
FIG. 10 is a flowchart illustrating a modification example of the control in the regeneration control device of the electrically powered vehicle shown in FIG. 7.
Figure 11:
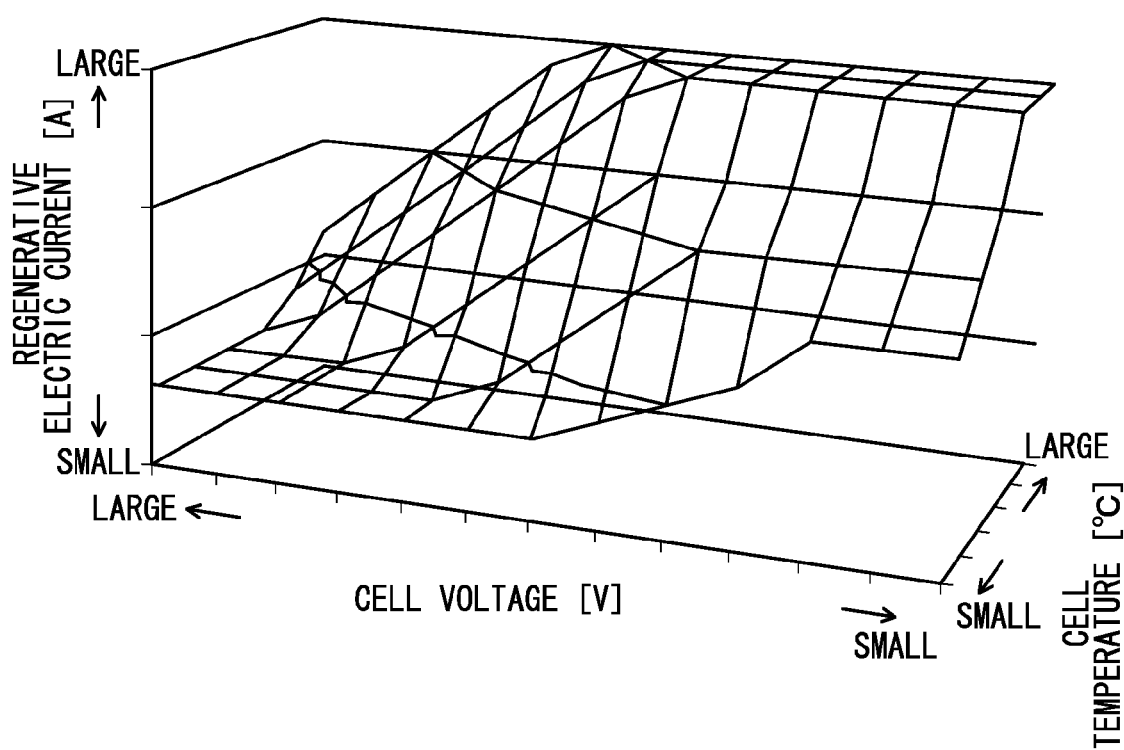
FIG. 11 is a map used for the control shown in FIG. 10.

FIG. 10 is a flowchart illustrating a control in a modification example according to the second embodiment, FIG. 11 is a map used for the control shown in FIG. 10. Since a regeneration control device of an electrically powered vehicle according to the present modification example may have the same configuration as the regeneration control device of the electrically powered vehicle shown in FIG. 1 according to the first embodiment, repetitive description thereof will be omitted.

In the regeneration control device of the electrically powered vehicle according to the present modification example, when the cell voltage of the battery device 18 reaches the upper limit voltage, the regenerative torque of the motor 16 is restricted, and the regenerative electric current flowing in the battery device 18 is restricted. In order to suppress considerable fluctuation in the regenerative torque during regenerative braking when the regenerative electric current is restricted, the ECU 19 monitors the cell voltage and cell temperature of the battery device 18, calculates the regenerative electric current according to the cell voltage and cell temperature, and controls the regenerative torque of the motor 16 so as not to exceed the regenerative electric current. Such a control will be described with reference to the flowchart of FIG. 10 and the map of FIG. 11 together with FIG. 1.

Firstly, the cell voltage and the cell temperature output from the battery device 18 are monitored (step S211). With respect to the cell temperature, for example, the temperature of each cell is monitored by the above-mentioned monitoring unit (temperature detection means). Further, the cell temperature of the battery device 18 may be directly monitored by the ECU 19 (temperature detection means). Here, it is preferable that the cell temperature be the temperature of a cell which is at the lowest temperature among all the cells in the battery device 18.

The regenerative electric current to the output cell voltage and the cell temperature is calculated from the 3D map of the regenerative electric current to the cell voltage and the cell temperature, shown in FIG. 11 (step S212). The calculated regenerative electric current means a maximum electric current value (upper limit value) capable of flowing under corresponding conditions. In the 3D map shown in FIG. 11, the regenerative electric current to the cell voltage has an approximately constant value in a case where the cell voltage is lower than a predetermined value, but in a case where the cell voltage is the predetermined value or higher, the regenerative electric current is decreased as the cell voltage is increased. Further, in the regenerative electric current to the cell temperature, the regenerative electric current is decreased as the cell temperature is decreased, whereas the regenerative electric current is increased as the cell temperature is increased. For example, in a case where the cell voltage is lower than the half of the upper limit voltage, the value of the regenerative electric current is approximately constant, and in a case where the cell voltage is half of the full charging or higher, the regenerative electric current is decreased as the cell voltage is increased.

Further, the regenerative torque of the motor 16 is notified to the inverter 17 in order not to exceed the calculated regenerative electric current (step S213). That is, the regenerative electric current is changed according to the cell voltage and the cell temperature of the battery device 18, and if the cell voltage is the predetermined value or higher, the regenerative electric current is decreased as the cell voltage is increased, and the regenerative electric current is increased as the cell temperature is increased. Thus, it is possible to generate optimal regenerative electric current according to the cell temperature. Further, by considering the cell temperature in order to calculate the regenerative electric current, it is possible to perform preferable charging and to suppress cell deterioration. With such a control, as shown in FIGS. 9 and 4, whenever the regeneration is performed, the cell voltage is increased, but if the cell voltage is the predetermined value or higher, the regenerative electric current is decreased as the cell voltage is increased. Thus, at the time t when the cell voltage reaches the upper limit voltage Vu, since the regenerative electric current is already in a decreased state, it is not necessary to considerably decrease the regenerative electric current at a time differently from the technique in the related art. As a result, it is possible to control the regenerative electric current so that the cell voltage does not exceed the upper limit voltage Vu, and since change in the regenerative electric current and change in the regenerative torque when the cell voltage is increased up to the vicinity of the upper limit voltage are decreased, it is possible to reduce the feeling of braking being unsettling.

A regeneration control device according to a third embodiment of the invention will be described.

Figure 12:
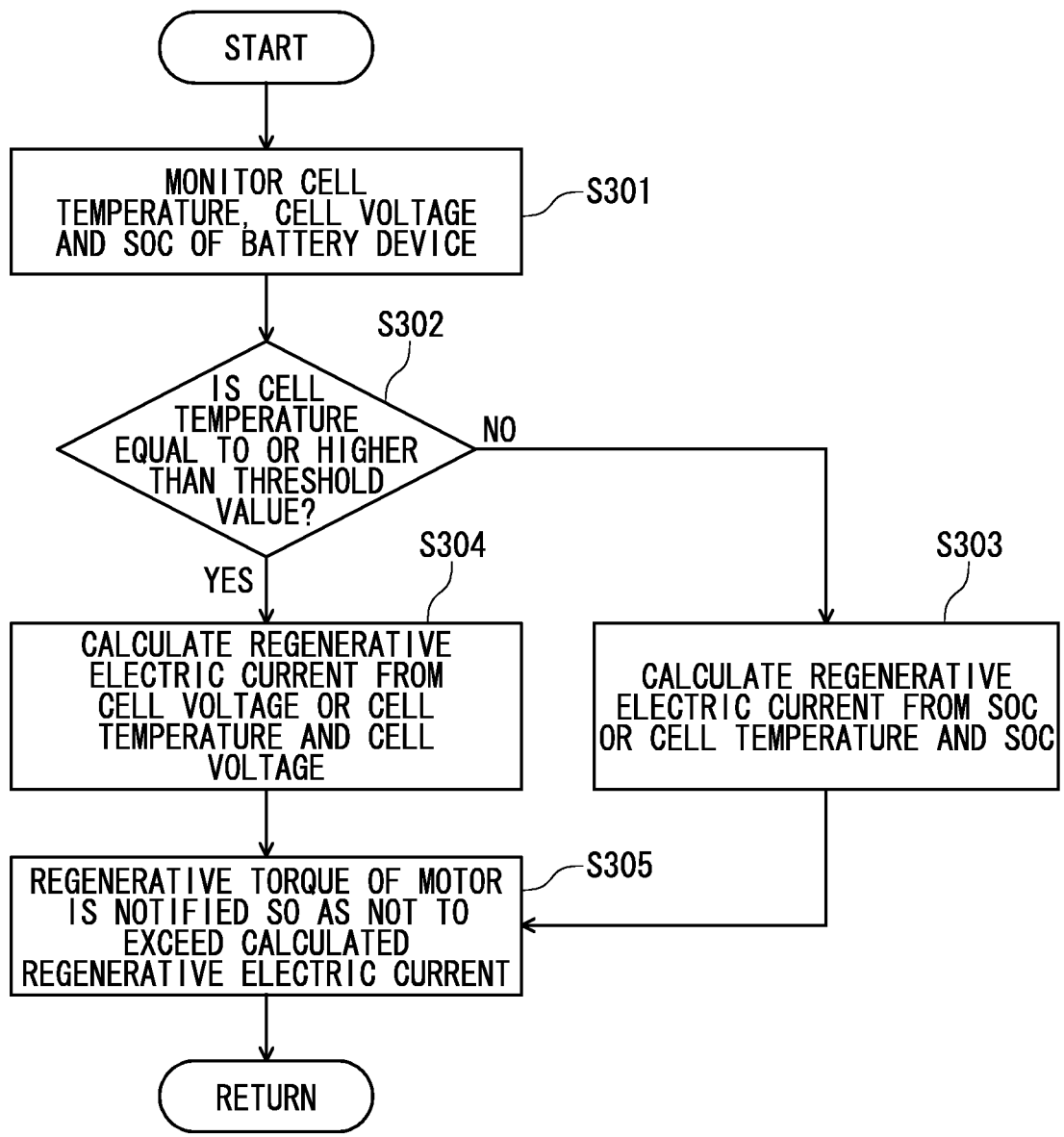
FIG. 12 is a flowchart illustrating a third embodiment of the control in the regeneration control device of the electrically powered vehicle shown in FIG. 1.
Figure 13:
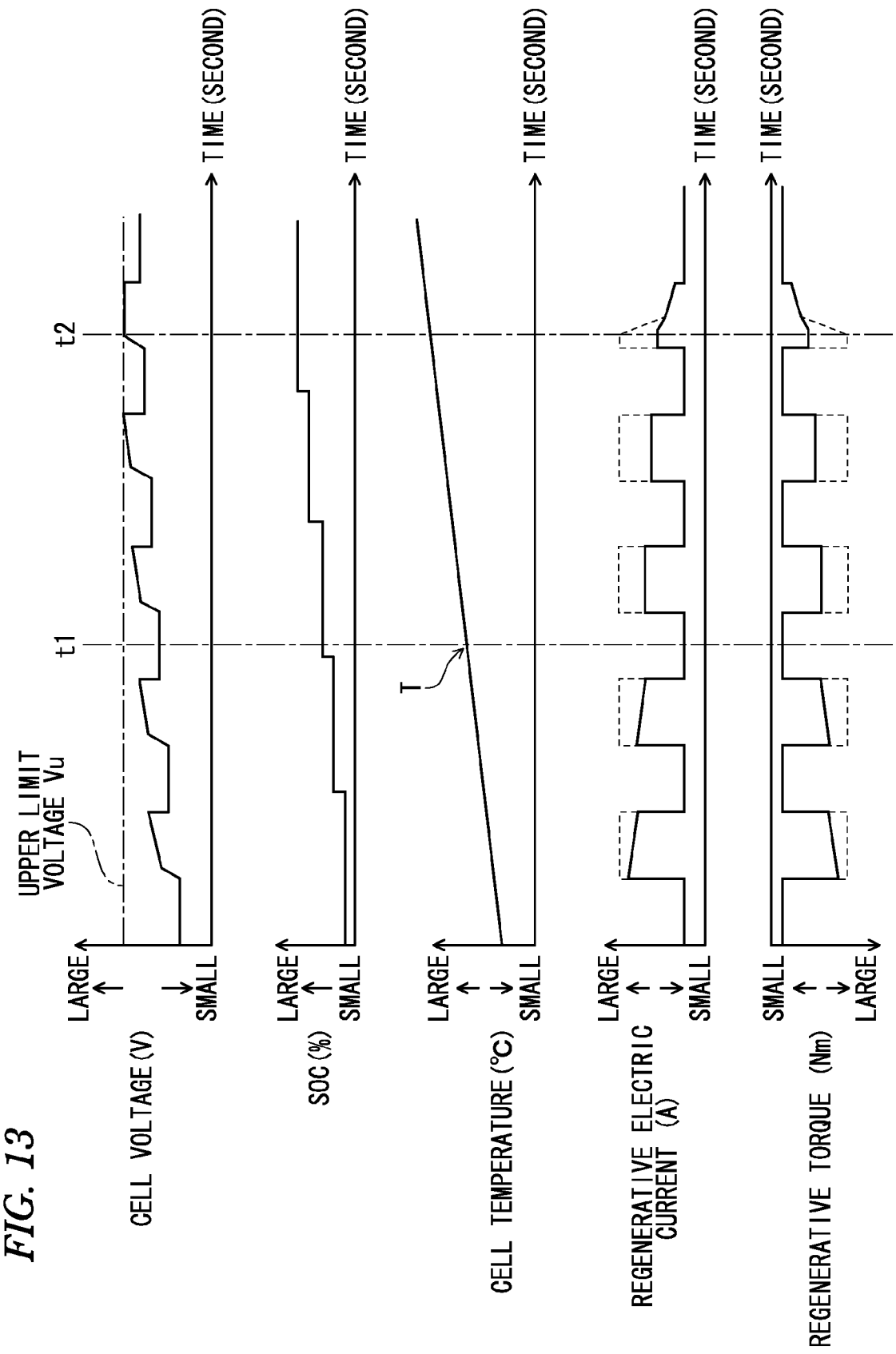
FIG. 13 is a time chart illustrating an example of change in cell voltage, regenerative electric current and regenerative torque according to the control shown in FIG. 12.
Figure 14:
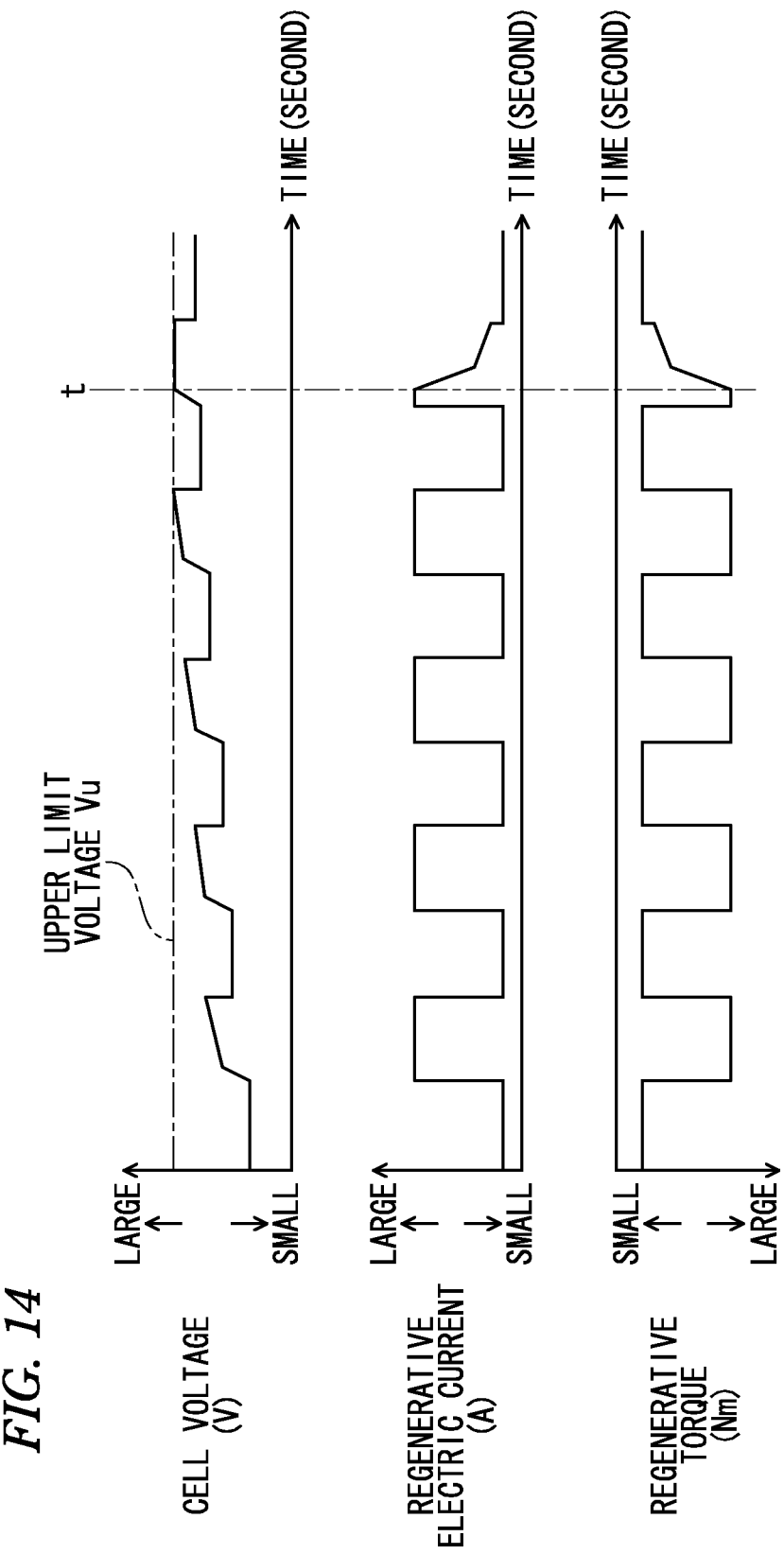
FIG. 14 is a time chart illustrating change in cell voltage, regenerative electric current and regenerative torque according to a regenerative control in the related art.

When the cell voltage of the battery device 18 reaches the upper limit voltage, the regenerative torque of the motor 16 is restricted, and the regenerative electric current flowing in the battery device 18 is restricted. In order to suppress considerable fluctuation in the regenerative torque during regenerative braking when the regenerative electric current is restricted, the ECU 19 monitors the cell temperature, the cell voltage and the SOC of the battery device 18, calculates the regenerative electric current according to the state, and controls the regenerative torque of the motor 16 so as not to exceed the regenerative electric current. Such a control will be described with reference to the flowchart of FIG. 12, the time charts of FIGS. 13 and 4, and the maps of FIGS. 8 and 6 together with FIG. 1. In FIGS. 13 and 4, one pulse represents one-time braking, and all the pulse widths are shown as the same width for simplicity of the drawings. Further, for comparison, time charts of regenerative electric current and regenerative torque in the related art are shown by dashed lines.

Firstly, the cell temperature, the cell voltage and the SOC output from the battery device 18 are monitored (step S301). With respect to the cell temperature and the cell voltage, for example, by installing a monitoring unit (temperature detection means and voltage detection means) which measures the cell temperature and the cell voltage of the battery device 18 and by outputting the cell temperature and the cell voltage to the ECU 19 from the monitoring unit, the cell temperature and the cell voltage of the battery device 18 are monitored. Further, the cell temperature and the cell voltage of the battery device 18 may be directly monitored by the ECU 19 (temperature detection means and voltage detection means). Further, the SOC of the battery device 18 is correlated to the cell voltage, and for example, in the monitoring unit (charging rate detection means), by calculating the SOC from the measured cell voltage and by outputting the SOC to the ECU 19 from the monitoring unit, the SOC of the battery device 18 is monitored. Further, by calculating the SOC from the cell voltage output to the ECU 19 from the battery device 18, the SOC of the battery device 18 may be monitored by the ECU 19 (charging rate detection means).

It is confirmed whether the output cell temperature is a predetermined threshold value T or higher. In a case where the output cell temperature is lower than the predetermined threshold value T, the procedure goes to step S303, and in a case where the output cell temperature is the predetermined threshold value T or higher, the procedure goes to step S304 (step S302).

In a case where the cell temperature is lower than the predetermined threshold value T, the regenerative electric current to the cell voltage or the regenerative electric current to the cell voltage and the cell temperature is calculated from the map of the regenerative electric current to the cell voltage, shown in FIG. 8 or the 3D map of the regenerative electric current to the cell voltage and the cell temperature, shown in FIG. 11 (step S303). The calculated regenerative electric current means a maximum electric current value (upper limit value) capable of flowing under corresponding conditions.

In the map shown in FIG. 8, the regenerative electric current to the cell voltage has an approximately constant value in a case where the cell voltage is lower than a predetermined value, but in a case where the cell voltage is the predetermined value or higher, the regenerative electric current is decreased as the cell voltage is increased. This is because, since even though charging power is sufficiently supplied to the battery device 18 in a case where the cell voltage is lower than the predetermined value, the cell voltage does not reach the upper limit voltage of the battery device 18, the supply of the regenerated electric power as much as possible can result in efficient charging of the battery device 18. Accordingly, in a case where the cell voltage is lower than the predetermined value, the regenerative electric current may be prevented from being decreased as the cell voltage is increased. For example, in a case where the cell voltage is smaller than a half of the upper limit voltage, the regenerative electric current has an approximately constant value, and in a case where the cell voltage is the half of the upper limit voltage or higher, the regenerative electric current is decreased as the cell voltage is increased.

Further, in the 3D map shown in FIG. 11, the regenerative electric current to the cell voltage has an approximately constant value in a case where the cell voltage is lower than a predetermined value, but in a case where the cell voltage is the predetermined value or higher, the regenerative electric current is decreased as the cell voltage is increased. Further, in the regenerative electric current to the cell temperature, the regenerative electric current is decreased as the cell temperature is decreased, whereas the regenerative electric current is increased as the cell temperature is increased. The SOC to be described later is a value correlated to the cell voltage, but the changing rate of the regenerative electric current to the cell voltage is greater than the changing rate of the regenerative electric current to the SOC.

On the other hand, in a case where the cell temperature is the predetermined threshold value T or higher, the regenerative electric current to the SOC or the regenerative electric current to the SOC and the cell temperature is calculated from the map of the regenerative electric current to the SOC, shown in FIG. 3 or the 3D map of the regenerative electric current to the SOC and the cell temperature, shown in FIG. 6 (step S304). The calculated regenerative electric current means a maximum electric current value (upper limit value) capable of flowing under corresponding conditions.

In the map shown in FIG. 3, the regenerative electric current to the SOC has an approximately constant value in a case where the SOC is lower than a predetermined value, but in a case where the SOC is the predetermined value or higher, the regenerative electric current is decreased as the SOC is increased. This is because, since even though charging power is sufficiently supplied to the battery device 18 in a case where the SOC is lower than the predetermined value, the cell voltage does not reach the upper limit voltage of the battery device 18, the supply of the regenerated electric power as much as possible can result in efficient charging of the battery device 18. Accordingly, in a case where the SOC is lower than the predetermined value, the regenerative electric current may be prevented from being decreased as the SOC is increased. For example, in a case where the SOC is smaller than a half of full charging, the regenerative electric current has an approximately constant value, and in a case where the SOC is the half of the full charging or higher, the regenerative electric current is decreased as the SOC is increased.

Further, in the 3D map shown in FIG. 6, the regenerative electric current to the SOC has an approximately constant value in a case where the SOC is lower than a predetermined value, but in a case where the SOC is the predetermined value or higher, the regenerative electric current is decreased as the SOC is increased. Further, in the regenerative electric current to the cell temperature, the regenerative electric current is decreased as the cell temperature is decreased, whereas the regenerative electric current is increased as the cell temperature is increased.

Further, the regenerative torque of the motor 16 is notified to the inverter 17 in order not to exceed the calculated regenerative electric current (step S305).

Here, in a case where the cell temperature is lower than the predetermined threshold value T, basically, the regenerative electric current is changed according to the cell voltage of the battery device 18, and in a case where the cell voltage is a predetermined value or higher, the regenerative electric current is decreased as the cell voltage is increased. With such a control, as shown in a part of the time chart up to a time t1 in FIG. 13 or as shown in FIG. 9, whenever the regeneration is performed, the cell voltage is increased, but in a case where the cell voltage is the predetermined value or higher, the regenerative electric current is decreased as the cell voltage is increased.

On the other hand, in a case where the cell temperature is the predetermined threshold value T or higher, basically, the regenerative electric current is changed according to the SOC of the battery device 18, and in a case where the SOC is a predetermined value or higher, the regenerative electric current is decreased as the SOC is increased. With such a control, as shown in a part of the time chart of the time t1 to a time t2 in FIG. 13 or as shown in FIG. 4, whenever the regeneration is performed, the cell voltage is increased, but since the SOC is increased as the cell voltage is increased, in a case where the SOC is the predetermined value or higher, the regenerative electric current is decreased as the SOC is increased.

In a case where the cell temperature is lower than the predetermined threshold value T and in a case where the cell temperature is the predetermined threshold value T or higher, in a case where the cell temperature is considered, the regenerative electric current is increased as the cell temperature is increased. Thus, it is possible to generate optimal regenerative electric current according to the cell temperature. Further, by considering the cell temperature in order to calculate the regenerative electric current, it is possible to perform preferable charging and to suppress cell deterioration.

Further, at the time (t2 or t) when the cell voltage reaches the upper limit voltage Vu, since the regenerative electric current is already in a decreased state, it is not necessary to considerably decrease the regenerative electric current at a time differently from the technique in the related art. As a result, it is possible to control the regenerative electric current so that the cell voltage does not exceed the upper limit voltage Vu, and since change in the regenerative electric current and change in the regenerative torque when the cell voltage is increased up to the vicinity of the upper limit voltage are decreased, it is possible to reduce the feeling of braking being unsettling.

Here, the time chart according to the control in the present embodiment is divided into ranges in which the cell temperature is changed, which will be described.

(1) In a case where a range in which the cell temperature is changed is a range before and after the predetermined threshold value T, firstly, in a case where the cell temperature is lower than the predetermined threshold value T, that is, in the part of the time chart up to the time t1 in FIG. 13, the regenerative electric current is controlled on the basis of the cell voltage or the cell voltage and the cell temperature, and the regenerative electric current is decreased as the cell voltage is increased during one-time braking and in one pulse indicating one-time braking. Also, during one-time braking, the regenerative electric current is decreased. Also, during one-time braking, using the map shown in FIG. 8 and the 3D map shown in FIG. 11, the regenerative electric current may be calculated on the basis of the changed cell voltage, and the regenerative electric current may be changed according to change in the cell voltage.

Further, by performing the electric power regeneration a plurality of times, a series of regenerative controls may be performed, and the decreasing rate of the regenerative electric current of each electric power regeneration in the plurality of electric power regenerations may be constant. Further, the regenerative electric current may be set so that the regenerative electric current at the end of the previous electric power regeneration and the regenerative electric current at the start of the next electric power regeneration are the same. With such a control, since the regenerative electric current is decreased at the constant decreasing rate, it is possible to reduce the feeling of braking being unsettling during one-time braking. Further, in the regenerative brakings which are continuously performed, by making the same the regenerative electric current at the end of the previous braking and the regenerative electric current at the start of the next braking, it is possible to reduce the driver feeling unsettled.

On the other hand, in a case where the cell temperature is the predetermined threshold value T or higher, that is, in the part of the time chart of the time t1 to the time t2 in FIG. 13, at the start of braking, the regenerative electric current is calculated on the basis of the SOC of the battery 18 or the SOC and the cell temperature using the map shown in FIG. 3 or the 3D map shown in FIG. 6, and during one-braking, the regenerative electric current is constant as the calculated regenerative electric current. This is based on the consideration that it is preferable to make constant the regenerative electric current during one-time braking in consideration of the fact that even though the regenerative electric current is supplied to the battery device 18, the regenerative electric current is not immediately reflected in the SOC (response of the SOC change is poor). In this case, the regenerative electric current is constant during one-time braking, but since the regenerative electric current is decreased according to the increase in the SOC based on the increase of the cell voltage through regeneration, at the time t2 when the cell voltage reaches the upper limit voltage Vu, the regenerative electric current is already in a decreased state, and change in the regenerative electric current and change in the regenerative torque at that time are decreased, to thereby reduce uncomfortable braking feeling.

As described with reference to FIG. 13, by switching regenerative electric current calculation means by the cell temperature of the battery device 18, it is possible to perform a preferable control. That is, in an area where the cell temperature of the battery device 18 is low (area where the cell temperature is lower than the predetermined threshold value T), since the regenerative electric current is calculated on the basis of the cell voltage which has good responsiveness to charging, it is possible to prevent the cell voltage from exceeding the upper limit voltage Vu, and thus, it is possible to suppress deterioration of the battery device 18. Further, in an area where the cell temperature of the battery device 18 is relatively high (area where the cell temperature is the predetermined threshold value T or higher), since the regenerative electric current is calculated on the basis of the SOC which has poor responsiveness to charging, it is possible to easily and constantly control the amount of generated electric power during one-time braking.

Further, in FIGS. 11 and 6, in a case where the cell temperature of the battery device 18 is lower than the predetermined threshold value T, the regenerative electric current is calculated on the basis of the cell voltage and the cell temperature, and in a case where the cell temperature is the predetermined threshold value T or higher, the regenerative electric current is calculated on the basis of the SOC and the cell temperature. The increasing rate of the regenerative electric current to the cell temperature is high in a case where the regenerative electric current is calculated using the SOC, compared with a case where the regenerative electric current is calculated using the cell voltage. This is because, since the cell temperature is low at the area where the cell temperature is low (area where the cell temperature is lower than the predetermined threshold value T), that is, in a case where the regenerative electric current is calculated using the cell voltage, if the increasing rate of the regenerative electric current to the temperature is increased, the cell voltage is likely to exceed the upper limit voltage Vu.

(2) In a case where the range in which the cell temperature is changed is a range in which the cell temperature is lower than the predetermined threshold value T, in a case where the cell temperature is lower than the predetermined threshold value T, that is, in FIG. 9, the regenerative electric current is controlled on the basis of the cell voltage or the cell voltage and the cell temperature, and the regenerative electric current is decreased as the cell voltage is increased during one-time braking and in one pulse indicating one-time braking. In this case, when the vehicle travels on a long downhill stretch, even though the cell voltage reaches the upper limit voltage Vu, since the regenerative electric current is already in a decreased state at the time t when the cell voltage reaches the upper limit voltage Vu, and change in the regenerative electric current and change in the regenerative torque are decreased, it is possible to reduce the feeling of braking being unsettling. The regenerative electric current may be calculated on the basis of the changed cell voltage using the map shown in FIG. 8 and the 3D map shown in FIG. 11 during one-time braking, and the regenerative electric current may be changed according to change in the cell voltage.

Further, by performing the electric power regeneration a plurality of times, a series of regenerative controls may be performed, and the decreasing rate of the regenerative electric current of each electric power regeneration in the plurality of electric power regenerations may be constant. Further, the regenerative electric current may be set so that the regenerative electric current at the end of the previous electric power regeneration and the regenerative electric current at the start of the next electric power regeneration are the same. With such a control, since the regenerative electric current is decreased at the constant decreasing rate, it is possible to reduce uncomfortable braking feeling during one-time braking. Further, in the regenerative brakings which are continuously performed, by making the same the regenerative electric current at the end of the previous braking and the regenerative electric current at the start of the next braking, it is possible to reduce the driver feeling unsettled.

(3) In a case where the range in which the cell temperature is changed is a range in which the cell temperature is the predetermined threshold value T or higher, in a case where the cell temperature is the predetermined threshold value T or higher, that is, in FIG. 4, the regenerative electric current is calculated on the basis of the SOC of the battery device 18 or the SOC and the cell temperature using the map shown in FIG. 3 or the 3D map shown in FIG. 6 at the start of braking, and the regenerative electric current is constant as the calculated regenerative electric current during one-time braking. This is based on the consideration that it is preferable to make constant the regenerative electric current during one-time braking in consideration of the fact that even though the regenerative electric current is supplied to the battery device 18, the regenerative electric current is not immediately reflected in the SOC (response of the SOC change is poor). In this case, the regenerative electric current is constant during one-time braking, but since the regenerative electric current is decreased as the SOC is increased according to the increase in the cell voltage through regeneration, at the time t when the cell voltage reaches the upper limit voltage Vu, the regenerative electric current is already in a decreased state, and change in the regenerative electric current and change in the regenerative torque at that time are decreased, to thereby reduce the feeling of braking being unsettling.

As described above, according to the invention, since the regenerative electric current is decreased as the charging rate of the battery is increased, it is possible to gradually decrease the regenerative braking force so as not to exceed the upper limit voltage of the battery correlated to the charging rate. Thus, it is possible to avoid the stopping of the electric power regeneration control caused by the problem that the battery voltage exceeds the upper limit voltage by the electric power regeneration, and to avoid the torque lack due to the stop of the electric power regeneration control. Thus, it is possible to provide regenerative torque which does not give an unsettling feeling to a driver, and as a result, it is possible to reduce the unsettling feeling of braking in which torque suddenly lacks during regenerative braking.

According to the invention, since the regenerative electric current is decreased as the voltage of the battery is increased, it is possible to gradually decrease the regenerative braking force so as not to exceed the upper limit voltage of the battery. Thus, it is possible to avoid the stop of the electric power regeneration control caused by the problem that the battery voltage exceeds the upper limit voltage by the electric power regeneration, and to avoid the torque lack due to the stop of the electric power regeneration control. Thus, it is possible to provide regenerative torque which does not give uncomfortable feeling to a driver, and as a result, it is possible to reduce uncomfortable brake feeling in which torque suddenly lacks during regenerative braking.

According to the invention, since the cell temperature of the battery device is monitored, the regenerative electric current flowing in the battery device is calculated on the basis of the voltage value of the battery when the cell temperature is lower than the predetermined threshold value and is calculated on the basis of the charging rate of the battery when the cell temperature is the predetermined threshold value or higher, and the regenerative torque is controlled so as not to exceed the calculated regenerative electric current, it is possible to decrease change in the regenerative electric current and change in the regenerative torque during braking when the cell voltage is increased up to the vicinity of the upper limit. As a result, it is possible to reduce an unsettling feeling of braking. Further, in the range where the cell temperature is low (lower than the predetermined threshold value), since the regenerative electric current is calculated on the basis of the cell voltage having good responsiveness to charging, it is possible to avoid exceeding the upper limit voltage of the battery, thereby making it possible to suppress deterioration of the battery. Further, in the range where the cell temperature is high (the predetermined threshold value or higher), since the regenerative electric current is calculated on the basis of the cell charging rate having poor responsiveness to charging, it is possible to constantly control the amount of generated electric power during one-time braking with ease.

Further, the invention is not limited to the above-described embodiments, and may be specified by modifying the components in a range without departing from the spirit thereof at the stage of reduction to practice. Further, the plurality of components disclosed in the above-described embodiments may be appropriately combined to form a variety of inventions. For example, some of all the components shown in the above-described embodiments may be omitted. Further, the components in the different embodiments may be appropriately combined with each other.

The invention is based on Japanese Patent Application No. 2011-156268, No. 2011-156269 and No. 2011-156270 filed Jul. 15, 2011, the content of which is incorporated herein by way of reference.

What is claimed is:

1. A regeneration control device of an electrically powered vehicle, comprising:
   a motor generator configured to perform electric power regeneration by braking a driving wheel of the electrically powered vehicle;
   a battery to which electric power regenerated by the motor generator is supplied;
   monitoring means including at least one of charging rate detection means configured to detect a charging rate of the battery and voltage value detection means configured to detect a voltage value of the battery; and
   control means configured to control the electric power regeneration of the motor generator according to at least one of the charging rate and the voltage value of the battery detected by the monitoring means,
   wherein the control means is configured to decrease regenerative electric current of the motor generator as at least one of the charging rate and the voltage value is increased, and
   wherein the control means is configured to perform a series of regenerative controls by performing the electric power regeneration a plurality of times, and a value of the regenerative electric current during a succeeding regenerative control is set smaller than a value of the regenerative electric current during a preceding regenerative control.

2. The regeneration control device according to claim 1, wherein the control means is configured to decrease the regenerative electric current of the motor generator as the charging rate detected by the charging rate detection means is increased.

3. The regeneration controls device according to claim 1, wherein the control means is configured to decrease the regenerative electric current of the motor generator as the voltage value detected by the voltage value detection means is increased.

4. The regeneration control device according to claim 2, wherein the control means is configured to restrict, in a state where the charging rate of the battery is smaller than a predetermined value, the decrease in the regenerative electric current of the motor generator as the charging rate is increased.

5. The regeneration control device according to claim 2, wherein the monitoring means further includes temperature detection means configured to detect a temperature of the battery, and
the control means is configured to increase the regenerative electric current as the temperature of the battery detected by the temperature detection means is increased.

6. The regeneration controls device according to claim 2, wherein the control means is configured to make constant the regenerative electric current in each electric power regeneration among the plurality of electric power regenerations.

7. The regeneration controls device according to claim 3, wherein the control means is configured to make constant a decreasing rate of the regenerative electric current in each electric power regeneration among the plurality of electric power regenerations.

8. The regeneration controls device according to claim 7, wherein the control means is configured to make an amount of generated electric power at start of one of the electric power regenerations equal to an amount of generated electric power at end of another one of the electric power regenerations followed by the one of electric power regeneration.

9. The regeneration control device according to claim 3, wherein the monitoring means further includes temperature detection means configured to detect a temperature of the battery, and
the control means increases the regenerative electric current as the temperature of the battery detected by the temperature detection means is increased.

10. A regeneration control device of an electrically powered vehicle, comprising:
    a motor generator configured to perform electric power regeneration by braking a driving wheel of the electrically powered vehicle;
    a battery to which electric power regenerated by the motor generator is supplied;
    temperature detection means configured to detect a temperature of the battery;
    voltage detection means configured to detect a voltage value of the battery;
    charging rate detection means configured to detect a charging rate of the battery; and
    control means configured to control the electric power regeneration of the motor generator,
    wherein the control means sets, in a state where the temperature of the battery detected by the temperature detection means is lower than a predetermined value, regenerative electric current supplied to the battery based on the voltage value of the battery detected by the voltage detection means, and
    wherein the control means sets, in a state where the temperature of the battery detected by the temperature detection means is equal to or higher than the predetermined value, the regenerative electric current supplied to the battery based on the charging rate detected by the charging rate detection means.

11. The regeneration control device according to claim 10, wherein the control means is configured to increase the regenerative electric current as the temperature of the battery is increased.

12. The regeneration control device according to claim 11, wherein an increasing rate of the regenerative electric current with respect to the temperature of the battery which is calculated based on the charging rate is larger than the increasing rate of the regenerative electric current with respect to the temperature of the battery which is calculated based on the voltage value.

* * * * *